United States Patent [19]

Brown et al.

[11] 3,970,262

[45] July 20, 1976

[54] QUICK-RELEASE HUB

[75] Inventors: Ralph A. Brown; Wilford W. Snow, both of Bountiful, Utah

[73] Assignee: Sperry Rand Corporation, New York, N.Y.

[22] Filed: May 27, 1975

[21] Appl. No.: 581,013

[52] U.S. Cl. ............................................. 242/68.3
[51] Int. Cl.². ........................................ B65H 17/02
[58] Field of Search .................... 242/68.3, 72.1, 72

[56] References Cited
UNITED STATES PATENTS

| | | | |
|---|---|---|---|
| 3,124,319 | 3/1964 | Cohen | 242/68.3 |
| 3,366,343 | 1/1968 | Messamer | 242/68.3 |
| 3,606,188 | 9/1971 | Wagner | 242/68.3 |
| 3,794,265 | 2/1974 | Jantzen | 242/68.3 |

FOREIGN PATENTS OR APPLICATIONS 1,196,930   7/1965   Germany ........................... 242/68.3

*Primary Examiner*—Edward J. McCarthy
*Attorney, Agent, or Firm*—Thomas P. Murphy; Thomas J. Nikolai; Marshall M. Truex

[57] ABSTRACT

A hub for mounting a reel of tape including means facilitating the rapid release of the reel. The hub comprises an internal structure including radially moveable elements having reel mounting surfaces surrounded by a flexible band which biases the elements in a radially inward direction. Means are provided for holding the elements in a first position to secure the reel on the mounting surfaces and selectively permitting the elements to assume a second position in response to the bias of the flexible band to release the reel.

5 Claims, 3 Drawing Figures

QUICK-RELEASE HUB

BACKGROUND OF THE INVENTION

In the computer field, one of the many ways for the storage of data is in the form of magnetic tape. This tape is wound on supply and take-up reels and in a manner well known in the art, fed past a read/write head for reading data into the computer or for writing data from the computer.

In a typical tape handler arrangement, the supply and take-up reels are mounted on hubs which rotate the reels in the desired manner under the control of an operator. Since tapes have only limited storage capacity, the operator must frequently remove the reels and replace them with others. The facility with which the operator can replace reels on the hub is an important factor in the effective use of a computer system.

Various hubs for facilitating the rapid replacement of reels are in use. However, the internal structure of these hubs is complex compared to the hub of the present invention.

The present invention contemplates a hub of novel construction which, due to its simplicity, makes for ease and economy of construction without sacrifice of durability and speed with which reels may be mounted and removed.

More particularly, the present invention contemplates a hub having an external housing comprising a back plate and a front plate. A plurality of arcuate-shaped segments are disposed on the back plate and together with extensions of the front plate form an outer circumferential surface area between the front plate and back plate. Disposed about the circumferential surface so formed is an elastic band biasing the segments radially inwardly. There is structure inside the hub which has a first position maintaining the segments in a position against the bias of the band for firmly securing a tape reel thereon. The internal structure has a second position permitting the bias of the band to move the segments radially inward so that the tape reel may be easily removed or placed on the hub. There are means associated with the internal structure for selectively moving it between the first and second positions.

Thus, the purpose of the present invention is to provide reliable economical hub of simple and economical construction which facilitates the speedy replacement of tape reels.

A better understanding of the present invention will be achieved upon reading the following description in conjunction with the drawing wherein.

Figure 1:
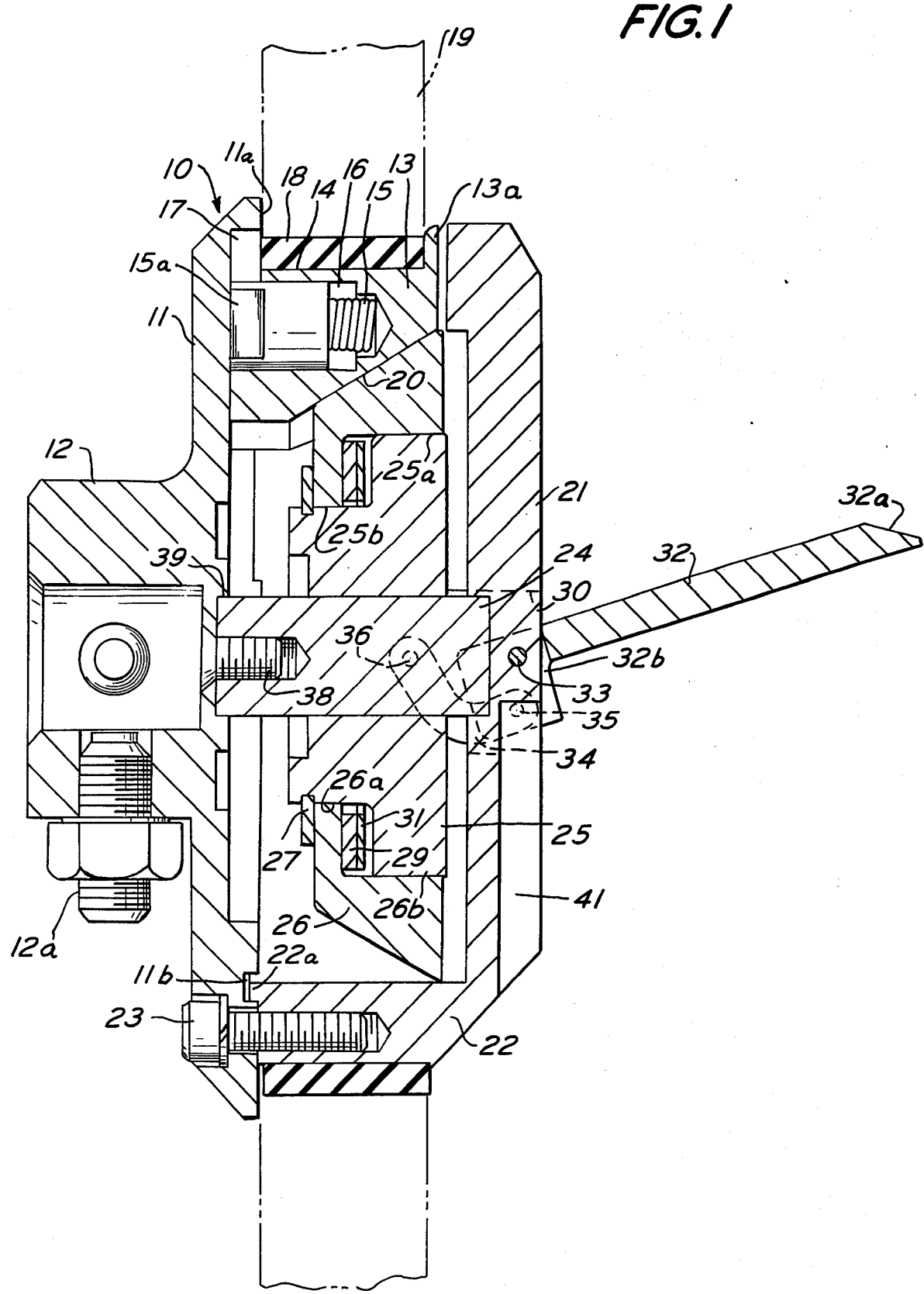
FIG. 1 is a sectional side view of the hub in the reel release condition.

Referring now more particularly to the drawings there is shown in FIG. 1 a hub 10 comprising a baseplate 11. Integrally formed with the baseplate is a shaft mount 12 for receiving the end of a drive shaft for rotating the hub. The drive shaft may be held in position by means of one or more lock screws 12a.

Disposed about the baseplate 11 are three segments 13. As readily seen in FIG. 3 the segments are equally spaced about the center periphery of baseplate 11. The segments 13 are arcuate in shape and as will be explained later in this specification have an outside surface 14 which forms part of the peripheral surface on which a tape reel may be mounted.

Each of the segments 13 are positioned on the baseplate by means of a spring-loaded pin 15. Each pin 15 is inserted into drilled holes 16 in each of the segments and has an end 15a disposed in slots 17 formed in baseplate 11. The shape of slots 17 as seen from FIG. 3 permits radial movement of the segments 13. The pins 15 lightly bias segments 13 away from baseplate 11. Carved out portion 11c of backplate permit the easy insertion of pin ends 15a into slots 17 during construction of the hub.

Figure 2:
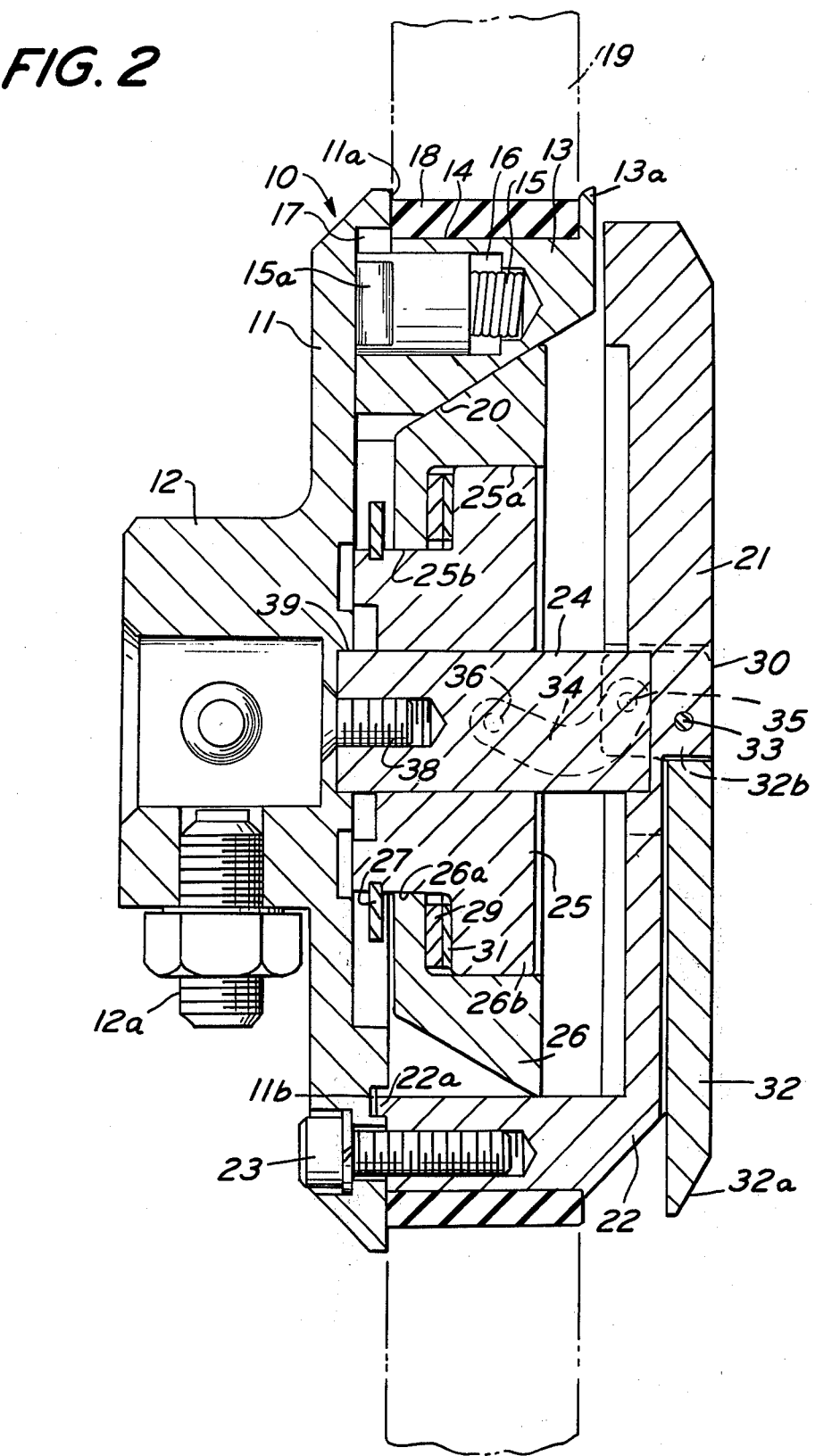
FIG. 2 is a sectional side view of the hub in the reel secure condition.

The cross section of the segments shown in FIGS. 1 and 2 shows a lip 13a. This lip on each of the segments 13 together with surface 14 and extension 11a of baseplate 11 assume the positions shown in FIGS. 1 and 2 when the hub is in the unlatched and latched positions, respectively.

An elastic band 18 is disposed about the hub 10 substantially as shown and has as one of its purposes the provision of a frictional gripping surface for the inner diameter of the reel indicated in outline by reference numeral 19. The band has a width slightly less than the distance between lip 13a and extension 11a shown in FIG. 2 and a diameter such that it exerts a radially inward bias force on the segments 13 in the position shown in FIG. 2.

Figure 3:
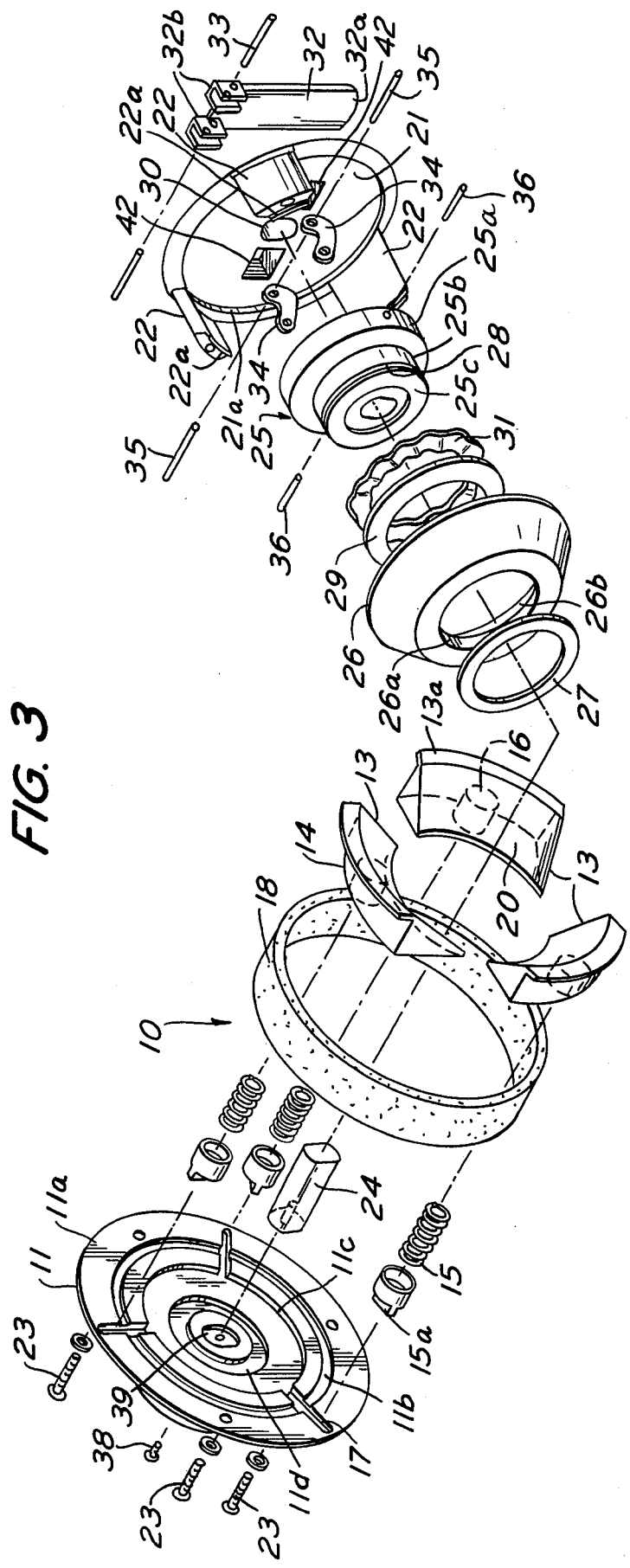
FIG. 3 is a perspective assembly view of the hub.

As best seen in FIG. 3 the inside radius 20 of the segments 13 is sloped radially outward as shown.

A front plate or housing 21 has integrally formed therewith three arcuate, equally spaced extensions 22. The extensions 22 fit between the segments 13 around the periphery of the baseplate 11. The outline of these extensions and their spatial relationship to the segments 13 is shown in FIG. 3. The housing 21 is secured to back plate 11 by a bolt 23 in each extension 22. Each extension 22 has a protuberance 22a which fits into annular slot 11b of back plate 11 to provide a more sturdy structure.

A shaft 24 secured to back plate 11 by a bolt 38 or any other convenient means extends axially through the internal portion of the hub and extends somewhat into the opening 30 in the housing 21 with its other end in opening 39 in back plate 11. The cross section of shaft 24 is preferably oblong as are openings 30 and 39.

Mounted for sliding axial movement along the shaft 24 is a cam guide 25. The cam guide 25 as seen in cross section in FIGS. 1 or 2 is machine or otherwise formed into two circular parts 25a and 25b. The diameter of part 25a is greater than part 25b.

A cam 26 of conical shape is mounted as by force fitting on the cam guide 25. As seen in cross section cam part 26a fits snugly around part 25a of cam guide 25 and cam part 26b fits snugly around part 25b of cam guide 25.

A retaining ring 27 snapped into a groove 28 formed in part 25a retains cam 26 in position on the guide 25.

The cam 26 is made of a hard plastic material, e.g. a polyacetal. The outside diameter of cam 26 is conically shaped at an angle complementary to that of the segments 13. When the cam guide 25 is moved to the position with portion 25c juxtaposed at annular slot 11d as shown in FIG. 2, the cam 26 slides against the complementary surface of the segments 13 and forces the segments 13 against the back plate 11 and to its most extreme radial outward position where it is locked in position as will be described below:

An annular pressure plate 29 and a wave washer 31 are disposed about part 25b of cam guide 25 between part 26b of cam 26 and part 25a of cam guide 25.

The wave washer 31 is of a type well known in the art and function to provide a slight spring action between cam 26, cam guide 25 and the segments 13 when the hub is in the latched state and provides a slight snap action during latching and unlatching. The pressure plate 29 functions merely to evenly distribute the spring force against the cam 26.

It should be noted that while the pressure plate 29 and wave washer 31 enhance the latching and unlatching, neither are actually required in the practice of the invention.

The structure for moving cam guide 25 and cam 26 along shaft 24 into and out of latched position will now be described:

An arm 32 having an end 32a which extends somewhat beyond the housing 21 to permit easy manipulation thereof is disposed within a notched out portion 41 of the housing 21. The arm is pinned to the housing at point 33 for rotation. The point 33 is located along the central axis of the hub.

The arm 32 has a pair of extensions 32b as best seen in FIG. 3 that straddle shaft 24 through openings 42 in housing 21. As shown in FIG. 3, each extension 32b has an L shaped linkage 34 pinned to it at point 35. These linkages also straddle the shaft 24 and extend through slots (not shown) in the cam guide 25 and are pinned at their ends to cam guide 25 at point 36. Point 36 is along the axis of the hub as is point 33. The point 35 as shown is located off center of the axis. This arrangement of pins provides off center lever action by which the lever 32, when it is in the position shown in FIG. 2 is locked and holds cam guide 25 and cam 26 in the position shown. On the other hand, when the arm 32 is lifted to the position shown in FIG. 1 the overcenter action is overcome, and the cam guide 25 and cam 26 is moved to the position shown in FIG. 1.

The operation of the latching and unlatching process is as follows:

When the arm 32 is in the unlatched position as shown in FIG. 1, the cam guide 25 and the cam 26 are in the extreme right position abutting housing 21. In the abutting position, the cam guide 25 extends into carved out portion 21a in the housing 21. In reaching this position, the conical outside diameter of cam 26 slides past the sloped inside diameter of the segments 13.

The segments 13 are moved radially inwardly by the force of the band 18 and to the right by the action of the spring loaded pins 15. The slots 17 permit the segment 13 to move radially. In the extreme position shown in FIG. 1 the lips 13a of segments 13 have moved so that they are flush with the outer periphery of the housing 21 and a reel is easily slipped into position.

To firmly secure the reel on the hub 1, the rod 32 is moved to the position shown in FIG. 2. Via linkages 34, the cam 26 moves to the left. By the camming action of the cam 26 against the inside diameter of the segments 13, the segments 13 are moved to the extreme left and to the radially outward position shown. As is easily seen in this position, the reel is tightly secured between the lips 13a of the segments 13 and extension 11a of the back plate 11. In addition, the inside diameter of the reel is frictionally engaged by the band 18 due to the outward extension of the segments.

The reel may be removed by reversing the process.

Since the outside diameter of the extensions 22 is slightly less than that of the segments 13 and band 18 when the segments 13 are in the fully extended position, the reel is supported only on the segments 13 when the hub is in the latched condition. However, when unlatched, it is the extensions 22 which support the reel.

What is claimed is:

1. A hub for mounting a reel, comprising in combination:
    a first circular plate,
    a plurality of arcuate shaped segments forming a circumferential surface,
    an elastic band disposed around said circumferential surface for biasing said segments in an inwardly radial direction,
    second means having a first position holding said segments in a radially outward extended position against the bias of said elastic band securing a reel about said circumferential surface,
    said elastic band frictionally engaging the reel when said second means is in said first position,
    said second means having a second position permitting said segments to be moved radially inward by said elastic band for releasing said reel,
    third means connected to said second means for selectively moving said second means between said first and second positions,
    each of said segments comprising a lip engaging said reel between said lips and said first plate when said segments are in said radially outward extended position and disengaging said reel to permit said reel to be removed from the hub when said segments are in the radially inward position,
    said first means further comprising a spring loaded pin for each of said segments normally biasing said segments away from said plate causing each of said segments to move longitudinally away from said first plate when said second means is in said second position.

2. A hub according to claim 1 wherein,
    said segments are equally spaced around the periphery of said first plate,
    each of said segments having a sloped surface opposite its circumferential surface.

3. A hub according to claim 2 wherein,
    said second means comprises a shaft rigidly fixed to and extending from the center of said first plate,
    cam means mounted for movement back and forth on said shaft,
    said cam means including a cam of conical cross section whose slope is complementary to the sloped surface of said segments whereby on movement toward said first plate said cam moves said segments radially outward.

4. A hub according to claim 3 wherein,
    said third means comprises lever means connected to said cam means for moving said cam means to a first position whereby said segments are held in an extreme outwardly radial position and to a second position whereby said elastic band and said spring loaded pins are free to move the segments radially inward and longitudinally away from said first plate to a release hub position,
    said lever means including means for locking said cam means in said first position.

5. A hub according to claim 4 including,
    a housing, said housing comprising a second circular plate,
said second plate having extensions integral therewith and fixed to said first plate,
said extensions disposed between said segments and forming a circumferential surface of slightly less diameter than the circumferential surface formed by said segments when said segments are in the extreme radially outward extended position and of slightly greater diameter when said segments are in the extreme radially inward position.

* * * * *